United States Patent
Mir et al.

(10) Patent No.: US 8,231,787 B2
(45) Date of Patent: Jul. 31, 2012

(54) TANGENTIAL FLOW FILTRATION SYSTEM

(75) Inventors: Leon Mir, Brookline, MA (US); Gaston de los Reyes, Somerville, MA (US)

(73) Assignee: SPF Innovations, LLC, Sommerville, MA (US)

( * ) Notice: Subject to any disclaimer, the term of this patent is extended or adjusted under 35 U.S.C. 154(b) by 164 days.

(21) Appl. No.: 12/435,481

(22) Filed: May 5, 2009

(65) Prior Publication Data
US 2009/0277833 A1 Nov. 12, 2009

Related U.S. Application Data

(60) Provisional application No. 61/050,770, filed on May 6, 2008.

(51) Int. Cl.
*B01D 61/00* (2006.01)
*B01D 63/00* (2006.01)
*B01D 35/00* (2006.01)
*B01D 21/30* (2006.01)

(52) U.S. Cl. ............ 210/650; 210/85; 210/90; 210/134; 210/321.65

(58) Field of Classification Search ............... 210/650, 210/257.2, 195.2, 85, 90, 97, 102, 103, 134, 210/137, 321.65, 416.1, 258
See application file for complete search history.

(56) References Cited

U.S. PATENT DOCUMENTS

| | | | | |
|---|---|---|---|---|
| 3,799,806 A | * | 3/1974 | Madsen | ............... 127/54 |
| 4,478,506 A | * | 10/1984 | Miyoshi et al. | ............... 399/317 |
| 4,549,662 A | * | 10/1985 | Schoenig et al. | ............... 209/539 |
| 5,200,090 A | | 4/1993 | Ford et al. | |
| 5,258,122 A | | 11/1993 | Ha et al. | |
| 5,366,630 A | * | 11/1994 | Chevallet | ............... 210/645 |
| 5,431,811 A | | 7/1995 | Tusini et al. | |
| 5,520,816 A | * | 5/1996 | Kuepper | ............... 210/649 |
| 5,589,076 A | | 12/1996 | Womack | |
| 5,593,580 A | | 1/1997 | Kopf | |
| 5,674,394 A | | 10/1997 | Whitmore | |
| 5,693,229 A | * | 12/1997 | Hartmann | ............... 210/650 |
| 5,762,789 A | | 6/1998 | de los Reyes et al. | |
| 5,947,689 A | | 9/1999 | Schick | |
| 5,958,244 A | | 9/1999 | Hartmann | |
| 6,197,194 B1 | | 3/2001 | Whitmore | |
| 6,296,770 B1 | | 10/2001 | Wilcox et al. | |
| 6,350,382 B1 | | 2/2002 | Schick | |
| 6,375,847 B1 | * | 4/2002 | Hartmann | ............... 210/650 |
| 6,478,969 B2 | | 11/2002 | Brantley et al. | |
| 6,561,172 B1 | * | 5/2003 | Chestnut et al. | ............... 123/585 |
| 6,579,494 B1 | * | 6/2003 | Chevallet et al. | ............... 422/3 |
| 6,607,669 B2 | | 8/2003 | Schick | |
| 6,635,180 B2 | * | 10/2003 | Olapinski et al. | ............... 210/651 |
| 6,852,219 B2 | * | 2/2005 | Hammond | ............... 210/222 |
| 7,255,792 B2 | * | 8/2007 | Livington | ............... 210/652 |

(Continued)

FOREIGN PATENT DOCUMENTS
WO    WO 98/50699    11/1998

(Continued)

*Primary Examiner* — Ana Fortuna
(74) *Attorney, Agent, or Firm* — Barry Gaiman (57) ABSTRACT

A system, method and device are disclosed for bio-processing a feed stream providing a constant output by operating a continuous single-pass tangential-flow process. Embodiments are operated without large circulation pumps. Other embodiments use components which can be disposed after a single use. The system, method and device can also be used to provide constant output diafiltration.

22 Claims, 8 Drawing Sheets

U.S. PATENT DOCUMENTS

| | | | |
|---|---|---|---|
| 7,288,195 B2 * | 10/2007 | Coville et al. | 210/321.75 |
| 7,384,549 B2 | 6/2008 | de los Reyes et al. | |
| 7,410,587 B2 * | 8/2008 | Schick | 210/651 |
| 7,510,654 B2 | 3/2009 | Mir et al. | |
| 7,588,688 B2 * | 9/2009 | Butters et al. | 210/650 |
| 2003/0116487 A1 | 6/2003 | Petersen | |
| 2003/0146156 A1 | 8/2003 | Siwak et al. | |
| 2004/0129678 A1 | 7/2004 | Crowley et al. | |
| 2004/0221897 A1 | 11/2004 | Schubmehl et al. | |
| 2005/0205489 A1 | 9/2005 | Siwak | |
| 2006/0027500 A1 | 2/2006 | Schick | |
| 2006/0043021 A1 | 3/2006 | Pesakovich et al. | |
| 2006/0060518 A1 | 3/2006 | Perreault | |
| 2006/0060531 A1 * | 3/2006 | Coville et al. | 210/650 |
| 2006/0249455 A1 | 11/2006 | Siwak et al. | |
| 2007/0029236 A1 | 2/2007 | Gaignet et al. | |
| 2007/0056894 A1 | 3/2007 | Connors, Jr. | |
| 2007/0151925 A1 | 7/2007 | de los Reyes et al. | |
| 2008/0245733 A1 | 10/2008 | de los Reyes et al. | |

FOREIGN PATENT DOCUMENTS

| | | |
|---|---|---|
| WO | WO 03/033120 | 4/2003 |

* cited by examiner

TANGENTIAL FLOW FILTRATION SYSTEM

CROSS-REFERENCE TO RELATED APPLICATIONS

This application claims the benefit of U.S. Provisional Application No. 61/050,770, filed May 6, 2008, which is incorporated by reference in its entirety.

BACKGROUND OF THE INVENTION

Ultrafiltration (UF) and microfiltration (MF) membranes have become essential to the separation and purification of macromolecules including the manufacture of biomolecules. Biomolecular manufacturing, regardless of its scale, generally employs one or more steps using filtration.

In one class of membrane separations, the species of interest is that which is retained by the membrane, in which case the objective of the separation is typically to remove smaller contaminants, to concentrate the solution, or to affect a buffer exchange using diafiltration. In another class of membrane separations, the species of interest is that which permeates through the filter, and the objective is typically to retain or remove larger contaminants. In MF, the retained species are generally particulates, organelles, bacteria or other microorganisms, while those that permeate are proteins, colloids, peptides, small molecules and ions. In UF the retained species are typically proteins and, in general, macromolecules, while those that permeate are peptides, ions and, in general, small molecules.

Permeation flux, also referred to as flux, is the flow rate of a solution through a filter per unit of membrane area. The ability to maintain a reasonably high flux is essential in the membrane separation filtration process. Low flux can result in long filtration times or require large filter assemblies, resulting in increased cost and large hold-up volumes retained in the modules and associated filter system equipment. The filtration process itself induces the creation of a highly concentrated layer of the retained species on the surface of the membrane, a phenomenon referred to as "concentration polarization," which reduces the flux from initial membrane conditions. In the absence of counter measures, the accumulation of retained particles or solutes on the surface of the membrane results in decreased flux and if not corrected the filtering process ceases to function efficiently. One conventional approach to overcoming the effects of concentration polarization in the practice of microfiltration and ultrafiltration is to operate the separation process in tangential flow filtration (TFF) mode.

TFF filters, modules and systems include devices having flow channels formed by membranes through which the feed stream flows tangentially to the surface of the membrane. The tangential flow induces a sweeping action that removes the retained species and mitigates accumulation, thereby maintaining a high and stable flux. Because higher tangential velocities produce higher fluxes, the conventional practice of TFF requires the use of high velocities in the flow channels, which in turn result in very high feed rates. In conventional systems short channels are also required to maintain reasonable feed pressures. These high feed rates in combination with relatively short channels result in only a small fraction of the feed being permeated, typically less than 10% and often less than 5%. The fraction of feed permeated in passing through a module is also referred to as conversion and the resulting increase in the concentration of compounds that do not permeate is known as the concentration factor or concentration. Low conversion means that the bulk of the feed stream exits the module as retentate concentrated in the retained solutes by only a few percent. Since many UF separations require high overall process conversions, as high as 99%, the retentate is typically recirculated back to the feed tank or directly to the inlet of that module for further permeation and concentration. In addition to the large pumps, pipes and flow components required in conventional TFF, systems with these recirculation loops are complicated by the requirement of additional piping, storage, heat exchangers, valves, sensors and control instrumentation.

In the pharmaceutical, vaccine production, and biotechnology industries, system or components used in manufacturing processes that are disposed of after a single use are known as "single use" or "disposable" products. These types of products are increasingly popular for a number of reasons, including the elimination of the need to clean the systems prior to the next use, the elimination of possible cross-contamination between successive batches, the elimination of the need to validate the performance of the product after reuse and reduction in the capital cost of the equipment. The principal drawback to the use of these products is the cost incurred in their purchase and disposal after a single use.

Ultrafiltration and microfiltration processes in the pharmaceutical and biotechnology industries are generally carried out in a tangential flow mode using batch systems. The fluid is pumped from a feed vessel through a suitable membrane module and back to the same vessel in order to achieve the necessary conversion or concentration. In some processes a new solvent, called the diafiltrate, is added to this vessel to compensate completely or partially for the fluid that permeates from the module, thereby replacing the original solvent with the new one being added. These tangential flow systems and processes are difficult to design for single use because the high volumetric flow rates through the module require large circulation pumps, large pipes and large ancillary hydraulic components such as valves, heat exchangers, etc. In reuse systems, these components are typically made of stainless steel and their disposal after a single use is typically economically prohibitive. Plastic components used in conventional single-use systems limit the combination of high pressure and large size. Batch filtration systems can be driven by peristaltic pumps, which provide a disposable fluid path and do not require the cleaning of the pumps or their disposal, but do require the use of large pumps and large diameter tubing. The complexity of the pumping systems also increases costs.

In the batch tangential flow operating mode, there are a number of approaches to controlling the concentration process. Since there are three fluids associated with the operation of tangential flow modules in a concentration mode—feed, retentate and permeate—it is only possible to control two associated parameters (i.e., there are only two degrees of freedom in the operation of such a module). Common pairs of parameters that are set or controlled are: feed flow rate and retentate pressure of module; feed flow rate and average transmembrane pressure; or feed flow rate and permeation rate. The feed rate is generally controlled by means of the speed of the feed pump or a throttling valve between the pump outlet and the inlet of the module. The retentate pressure is controlled by means of a throttling valve on the module outlet. Trans-membrane pressure can be controlled by use of a throttling valve on the permeate outlet in combination with the inlet and outlet pressures of the module. There are other ways of implementing concentration control, some of which are described in U.S. Pat. Nos. 6,607,669 and 6,350,382. These patents teach weighing the feed in order to monitor a batch/recirculation process controlled by valves and pumps. These systems are generally not designed for single use because of the expensive valves and large circulation pumps, and the complexity resulting from the existence of a recirculation loop.

In batch tangential flow ultrafiltration or microfiltration diafiltrate is generally added to the feed tank in proportion to the rate of permeation. Most commonly the rate of diafiltrate addition is set equal to the rate of permeation. This is accomplished by pumping diafiltrate to the feed tank so as to keep the fluid level fixed. This is referred to as "constant volume diafiltration."

In single pass tangential flow processes operated at a high concentration factor a number of modules are connected in series forming a filtration train comprising multiple stages. A detailed description of the structure and operation of a single pass filtration (SPF) module is discussed in "Method And Apparatus For The Filtration Of Biological Solutions," U.S. Pat. No. 7,384,549, and "Method And Apparatus For The Filtration Of Biological Samples," U.S. Pat. No. 7,510,654, which are herein fully incorporated by reference. Control of the overall concentration factor is most commonly affected by using a feed pump and a retentate pump, operated at a fixed ratio of their flow rates, and referred to as feed-to-retentate flow-ratio-control ("FRC"). FRC represents a first control parameter. A second control parameter in such a system is typically the feed rate (alternatively the retentate rate can be controlled). It is, of course, also possible to control the average trans-membrane pressure of the entire system. In this case it is possible to use a control system based on controlling the feed rate in combination with control of the retentate pressure. Alternatively, the pressure on the combined permeate stream (i.e., the combined stream of all of the modules) can be throttled by means of a valve or by means of a pump on the combined permeate stream. It is also possible to control the individual permeation rate of any one or all of the stages of a staged system as long as the number of control parameters is not greater than the degrees of freedom in the staged single-pass system, which is equal to the number of stages plus one.

In diafiltration processes utilizing single pass systems, diafiltrate is added to some of the stages. The rate of diafiltrate addition to each stage can be controlled by controlling the total rate of diafiltrate addition, by any suitable means, in combination with the use of a diafiltrate distributor, an array of hydraulic restrictors, effectively distributing the diafiltrate among the stages accepting diafiltration. Generally it is desirable to operate such a single-pass diafiltration process in "constant volume" mode in each stage, whereby the rate of diafiltrate addition to each stage is made approximately equal to the rate of permeation from that stage.

The most common diafiltration flow configuration in single pass TFF processes is the "cross-current" configuration, according to which fresh diafiltrate is added to each stage. A "counter-current" configuration is sometimes used to reduce diafiltrate requirements. In counter current diafiltration fresh diafiltrate is added to one or more of the stages proximal to the retentate outlet and permeate from one or more of these stages serves as diafiltrate to one or more of the preceding stages. In both these forms of single-pass staged diafiltration process the total amount of diafiltrate required to achieve a given degree of removal of the permeating impurity decreases as the total membrane area is subdivided into a larger number of stages. The practical limit on the number of stages used is given by the increased cost as the total membrane area is divided into smaller stages.

TFF systems operated as batch systems require the use of large circulation pumps and associated piping. This results in large hold-up volumes and the additional complexity of tanks, valves, and instrumentation required to effectively operate a process with a recirculation stream. Because of the large size of the pumps and the additional complexity, such single-use systems (i.e., based on conventional TFF processes) are generally economically prohibitive.

BRIEF SUMMARY OF THE INVENTION

Advantageously, a simple, low cost and compact TFF system and process suited for the needs of pharmaceutical and biotech processes and particularly for processing shear sensitive proteins, which is able to yield high reliable flux and high conversion without the need of recirculation loops, is provided in accordance with the invention. Moreover, bio-processing separation can be operated in a single pass mode without the complexity of a recirculation loop while providing a high conversion with a relatively low hold up volume. Furthermore, a diafiltration process can be operated in a single use, single pass mode.

In accordance with one aspect of the present invention, a filtration system includes a single pass tangential-flow filtration (SPF) module having a feed inlet, a retentate outlet and a permeate outlet, a first container coupled to a first controllable pressure source and fluidly coupled to one of the feed inlet, the retentate outlet and the permeate outlet and a first mass measurement device to measure the mass of a fluid in the first container. The system further includes a second container coupled to a second controllable pressure source and fluidly coupled to a different one of the feed inlet, retentate outlet and the permeate outlet and a second mass measurement device to measure the mass of a fluid in the second container. The system further includes a pressure controller to control the first and second pressure sources in response to measurements from the respective mass measurement devices.

Such a system makes possible the operation in a SPF mode without a recirculation loop or pumps while providing a high conversion with a relatively low hold up volume and disposable components. Single pass operation is achieved by using combinations of gas pressurized containers for the feed, retentate and permeate. By applying a controlled pressure to at least two of the feed, retentate and permeate containers the flow rates of feed, retentate and permeate can be controlled, as described further below.

In accordance with another aspect of the present invention, a filtration system includes a single pass filtration module having a feed inlet, diafiltrate inlet, a retentate outlet and a permeate outlet, a first container coupled to a first controllable pressure source, said first container further coupled to a first mass measurement device and fluidly coupled to one of the feed inlet, diafiltrate inlet the retentate outlet and the permeate outlet, a second and third container coupled to a second and third controllable pressure source and said second and third containers further coupled to a second and third mass measurement devices and fluidly coupled to a different one of the feed inlet, diafiltrate inlet retentate outlet and the permeate outlet. The system further includes a pressure controller to control the said pressure sources in response to measurements of the masses of the fluids in the said containers obtained from the respective mass measurement devices. The said pressure sources create a flow of fluid from the feed container and diafiltrate container to the retentate and permeate containers without the use of pumps. Such a system makes possible the operation in a single pass mode without a recirculation loop or pumps while providing a high conversion with a relatively low hold up volume and disposable components. Using combinations of gas pressurized containers for the feed, diafiltrate, retentate and permeate facilitates single use operation. By applying a controlled pressure to at least three of the feed, diafiltrate retentate or permeate containers the flow rates of feed, diafiltrate, retentate and permeate can be controlled, as described further below.

In these descriptions the term "mass" is used interchangeably with "volume" as the density of the material being treated is constant for the duration of the process (and typically close to that of water).

In one embodiment, the containers are equipped with scales or balances to measure the weights of the containers and the fluid contained therein. Electronic means are preferred for monitoring these weights, preferably on an essentially continuous basis. The weight of the containers can be monitored as a function of time and hence the rate of weight change of the containers calculated. Other embodiments include liquid level sensors to monitor the mass or volume of the fluids contained. It is also possible to monitor the flow rates of fluids entering or leaving the various containers by means of flow meters on the fluid lines between the various containers and thus to determine the masses or volumes in the various containers.

This control methodology does not require the use of disposable pumps and disposable sensors such as pressure gages and flow meters which might be disposed, the control method is relatively simple and inexpensive and therefore lends itself to "single use" operation. The disposable elements required are the single pass filtration module and associated tubing, and containers (in one embodiment, plastic bags). In another embodiment, reusable tanks can be substituted for disposable containers. Inclusion of suitable hydrophobic filters between the containers and the source of the controlled gas pressures prevents intrusion of the fluids into the gas source and its control elements, which makes it unnecessary to dispose of or clean these elements. If desired, pressure gages or other sensors, such as temperature gages, pH meters or spectrophotometer cells, can be positioned on various points of the system for the purpose of monitoring, but these sensors, which are generally disposed, are not needed for basic control of the process.

In accordance with another aspect of the invention, a method for filtering a liquid includes supplying a volume of the liquid from a feed container into a separation module (preferably, a single pass filtration module) comprising a separation element having at least one flow channel having an inlet, an outlet and surface comprising a filtration membrane, the feed container fluidly coupled to the channel inlet, a retentate container fluidly coupled to the channel outlet and a permeate container fluidly coupled to the separation element. The method further includes inducing the tangential flow of the liquid in the at least one flow channel by applying a first pressure differential between the feed container and retentate container and inducing the permeation of a portion of the liquid through the filtration membrane into the permeate container by applying a second pressure differential between one of: the retentate container and permeate container; and the feed container and permeate container. Preferably, embodiments of the method further comprise weighing at least two of the containers; and adjusting the first and second pressures in response to the weights. Such a method combines the high conversion features of SPF with pressure or vacuum driven flow system that eliminates fluid contact of mechanical components and thus provides an economically disposable TFF system.

BRIEF DESCRIPTION OF THE SEVERAL VIEWS OF THE DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

DETAILED DESCRIPTION OF THE INVENTION

In accordance with an embodiment of the invention, a filtration system is provided comprising a single pass filtration module comprising a feed inlet, a retentate outlet and a permeate outlet; a first container coupled to a first controllable pressure source and fluidly coupled to one of the feed inlet, the retentate outlet and the permeate outlet; a first mass measurement device disposed to measure the mass of a fluid in the first container; a second container fluidly coupled to a different one of the feed inlet, retentate outlet and the permeate outlet; a second mass measurement device disposed to measure the mass of a fluid in the second container; and a pressure controller to control the first pressure source in response to measurements from the respective mass measurement devices.

A method for filtering a liquid in accordance with an embodiment of the invention comprises supplying a volume of the liquid from a feed container into a separation module (preferably, a single pass filtration module) comprising: a separation element having at least one flow channel having an inlet, an outlet and surface comprising a filtration membrane; the feed container fluidly coupled to the channel inlet; a retentate container fluidly coupled to the channel outlet; a permeate container fluidly coupled to the separation element; inducing the tangential flow of the liquid in the at least one flow channel by applying a first pressure differential between the feed container and retentate container; and inducing the permeation of a portion of the liquid through the filtration membrane into the permeate container by applying a second pressure differential between one of: the retentate container and permeate container; and the feed container and permeate container; measuring the flow rates of the at least two of feed, retentate, and permeate; and adjusting the first and second pressure differentials in response to the flow rate measurements. In some embodiments, the method includes supplying a predetermined volume of the liquid from the feed container.

In the following description, the terms "vessels" and "containers" are used interchangeably. In one embodiment, the containers are equipped with scales or balances to measure the weights of the container and the mass of fluid contained therein. Electronic means are preferred for monitoring these weights, preferably on an essentially continuous basis. If the mass measurement device is a scale, the weight of the containers can be monitored as a function of time in order to calculate the rate of mass change within the containers. In another embodiment the masses within the containers can be monitored with fluid level sensors. In still another embodiment the mass of the fluids can be obtained from flow meters located on the conduits connecting the vessels, e.g., the feed, retentate, diafiltrate and/or permeate vessels. In still another version it is possible to use control valves to supplement the control provided by pressurization of the tanks. In an alternative embodiment a retentate valve is used.

Embodiments of the present invention relate to the separation and/or purification of substances by tangential flow membrane filtration, and more specifically, to single use SPF processes and devices. The devices and methods of the present invention utilize filtration membranes to separate components in a feed stream in a single pass at high conversion and high decontamination factors. As these are pressure-driven separations, the ultimate driving forces are pressure differentials. Suitable sources to induce the necessary pressure differentials include, but are not limited to, compressed gases, vacuum sources, and combinations thereof. It will be appreciated, that the ambient atmospheric pressure can operate as one or more of the pressure sources. Aspects of the present invention use these driving forces and a control system which monitors the mass (also referred to as weight) of at least two of the feed, retentate and permeate and controls two flow rates in the case of a concentration process to allow effective operation in a single pass while using a few inexpensive disposable components. It is understood, that monitoring or measuring the mass of the feed, retentate and permeate can be accomplished several ways, including but not limited to, weighing, measuring volumes (e.g., by measuring the height of the liquid within the tank), and measuring flow rates into or out of a container. When diafiltration is used, the control system also monitors the weight of the diafiltrate and three flow rates are controlled.

Embodiments of the invention involving the use of disposable or "single use" systems, are particularly suitable for applications in the biotechnology industry, because single use avoids the need for cleaning, cleaning validation and validation of the performance of the re-used filter. Furthermore, single-use completely eliminates the possibility of cross-contamination, which is an important aspect of pharmaceutical processing. Embodiments of single use TFF (UF or MF) systems of the instant invention are advantageous in that large pumps, large pipes and large valves are not required, and an economically operatable system can be provided that includes economically disposable elements such as filtration modules and tubing and may include the containers. Embodiments of tangential flow systems according to the invention are particularly suitable for applications in the biotechnology industry, as the inventive systems do not expose proteins (particularly high molecular weight proteins) or other solutes to fluid shear in pumps. Additionally, embodiments of the invention can be carried out while avoiding large mixing currents in a recirculation tank, thus minimizing or avoiding foaming, which can damage sensitive macromolecules.

Before describing the invention, it may be helpful to an understanding thereof to set forth definitions of certain terms to be used herein. The term "separation" generally refers to the act of separating the feed into two streams, a permeate stream and a retentate stream. The terms "feed" and "feed stream" refer to the solution being fed to the filtration module for separation. The terms "permeate" and "permeate stream" refer to that portion of the feed that has permeated through the membrane. The terms "retentate" and "retentate stream" refer to the portion of the solution that has been retained by the membrane, and the retentate is the stream enriched in a retained species. The terms "diafiltrate" and "diafiltrate stream" refer to the solution being used to affect the diafiltration process.

The expressions "flow channel" and "channel" are herein used synonymously to denote the separation channel comprising a membrane and in which the solution being separated is flowing in a tangential flow fashion. In certain embodiments, the separation channel comprises walls that are formed at least in part from an ultrafiltration membrane and in other embodiments from a microfiltration membrane. While channels can have an axis defined by the direction of the flow of liquid at any point of the channel, it should be understood that this does not require that the channels be straight. Channels can be straight, coiled, arranged in zigzag fashion, and in general can have any topology which supports tangential flow. Channels can be open, as in an example of channels formed by hollow fiber membranes, or they can have flow obstructions, as in the case, for example, of rectangular channels formed by flat-sheet membranes spaced apart by woven or non-woven spacers.

The expressions "single-pass conversion," "conversion per pass" and "conversion" are used herein to denote the fraction of the feed volume that permeates through the membrane in a single pass through the filtration module, expressed as a percentage of the feed stream volume. The terms "single pass concentration factor" and "concentration factor" as used herein describe the degree of concentration achieved for a specific species of interest as a result of a single pass through the filtration module. The concentration factor is also a dimensionless quantity and expressed as the ratio of the concentration of the retained species in the retentate to that of the retained species in the feed. In cases where the retained species is almost completely retained the concentration factor can also be expressed as the ratio of the volume of the feed divided by the volume of the retentate.

The expressions "liquid velocity" and "velocity" are herein used synonymously and refer to the velocity of the liquid within the flow channel in the direction of the flow path averaged across the channel cross-section. This definition recognizes that, in any flow channel, the velocity of the liquid is zero at any solid surface and increases away from a solid surface. The expressions "entrance velocity" and "inlet velocity" are herein used to refer to the velocity of the liquid at the entrance of a channel. The term "recovery" is used to denote the mass fraction of the species of interest recovered in the fraction of interest (permeate or retentate) expressed as a percentage of the mass of that species contained in the feed stream. The terms "volumetric flux," "permeation flux" and "flux," designated by the symbol J, are used to describe the rate of permeation of the solution through the membrane, expressed herein with the units of liters per hour per $m^2$ of membrane area and abbreviated as "lmh." The term "decontamination factor" is herein used to refer to the concentration of the contaminant in the feed stream divided by the concentration of the contaminant in the retentate stream.

The expressions "specific membrane area of the flow channel," "specific membrane area of the channel," and "specific membrane area," designated by the symbol $\sigma_c$, are herein used to denote the amount of membrane area contained in a channel per unit channel void volume. Expressed in units of cm-1, $\sigma_c$ is defined by the following equation:

$$\sigma_c = \frac{\text{Membrane Area of Flow Channel [cm}^2\text{]}}{\text{Void Volume of Flow Channel [cm}^3\text{]}}. \tag{1}$$

In a multi-stage system, $\sigma_c$ for a stage is represented by the $\sigma_c$ of the channel having the largest $\sigma_c$ in that stage, and generally the channels in a stage have substantially equal values of $\sigma_c$.

The expressions "specific feed flow rate" and "specific feed rate" designated by the symbol F, are herein used synonymously to describe the flow rate of the feed stream divided by the membrane area of the module. F is expressed in units of lmh as follows:

$$F = \frac{\text{Module Feed Flow Rate}\left[\frac{\text{liters}}{\text{hr}}\right]}{\text{Module Membrane Area [m}^2\text{]}}. \tag{2}$$

The expressions "transmembrane pressure differential," "transmembrane pressure (TMP)" are herein used synonymously to describe the average pressure differential between the flow channel, and the permeate compartment, and given by:

$$TMP = P_F - P_P. \tag{3}$$

Where $P_F$=average of the pressure at the inlet and the outlet of the flow channel, $P_F=(P_{INLET}+P_R)/2$; and
$P_P$=pressure at the permeate compartment.

The expressions "transchannel pressure differential" and "transchannel pressure (TCP)" are herein used synonymously to describe the pressure differential between an inlet of a flow channel to an outlet of the flow channel, and is given by:

$$TCP = P_{INLET} - P_R; \tag{4}$$

where $P_{INLET}$=pressure at the inlet of the flow channel; and
$P_R$=pressure at the outlet of the flow channel.

The term "dimensionless length" is used herein to describe a product of channel length, L, and the specific membrane area, $\sigma_c$ from equation 1, of a channel, and is defined by the following equation:

$$\lambda = \sigma_c L. \tag{5}$$

The dimensionless length of a stage in a multi-stage system is given by the sum of the dimensionless lengths of the channels in the longest serial path in the stage as follows:

$$\lambda_{stage} = \sum_{j=1}^{m} \sigma_{c,j} L_j; \tag{6}$$

where m is the number of channels in the longest serial path in the stage;
$\sigma_{c,j}$ is the $\sigma_c$ of channel j in the longest serial path; and
Lj is the length of the jth channel.

The dimensionless length of a system in a multi-stage system having n stages is given by the sum of the dimensionless length of the stages of the system as follows:

$$\lambda_{system} = \sum_{i=1}^{n} \lambda_{stage,i}; \tag{7}$$

where n is the number of stages in the system; and
$\lambda_{stage,i}$ is the $\lambda$ for the ith stage.

The term "ultrafiltration membranes" and "UF membranes" are used herein to refer to membranes that have pore sizes in the range between about 1 nanometer to about 100 nanometers. The term "microfiltration membranes" and "MF membranes" are used herein to refer to membranes that have pore sizes in the range between about 0.1 micrometers to about 10 micrometers. UF membranes are useful, for example, for the separation of polymeric molecules from water and other low molecular weight solutes. Molecules that are too large to penetrate these pores are retained while water, dissolved salts and small molecules can pass through these pores. The retention behavior of a membrane forms the basis for characterizing UF membranes, known as the "molecular weight cut off" of the membranes, expressed in units of Daltons, and abbreviated as MWCO. In various embodiments, the present invention utilizes ultrafiltration membranes having MWCO ratings in the range from about 1,000 Daltons to several million Daltons.

Figure 1:
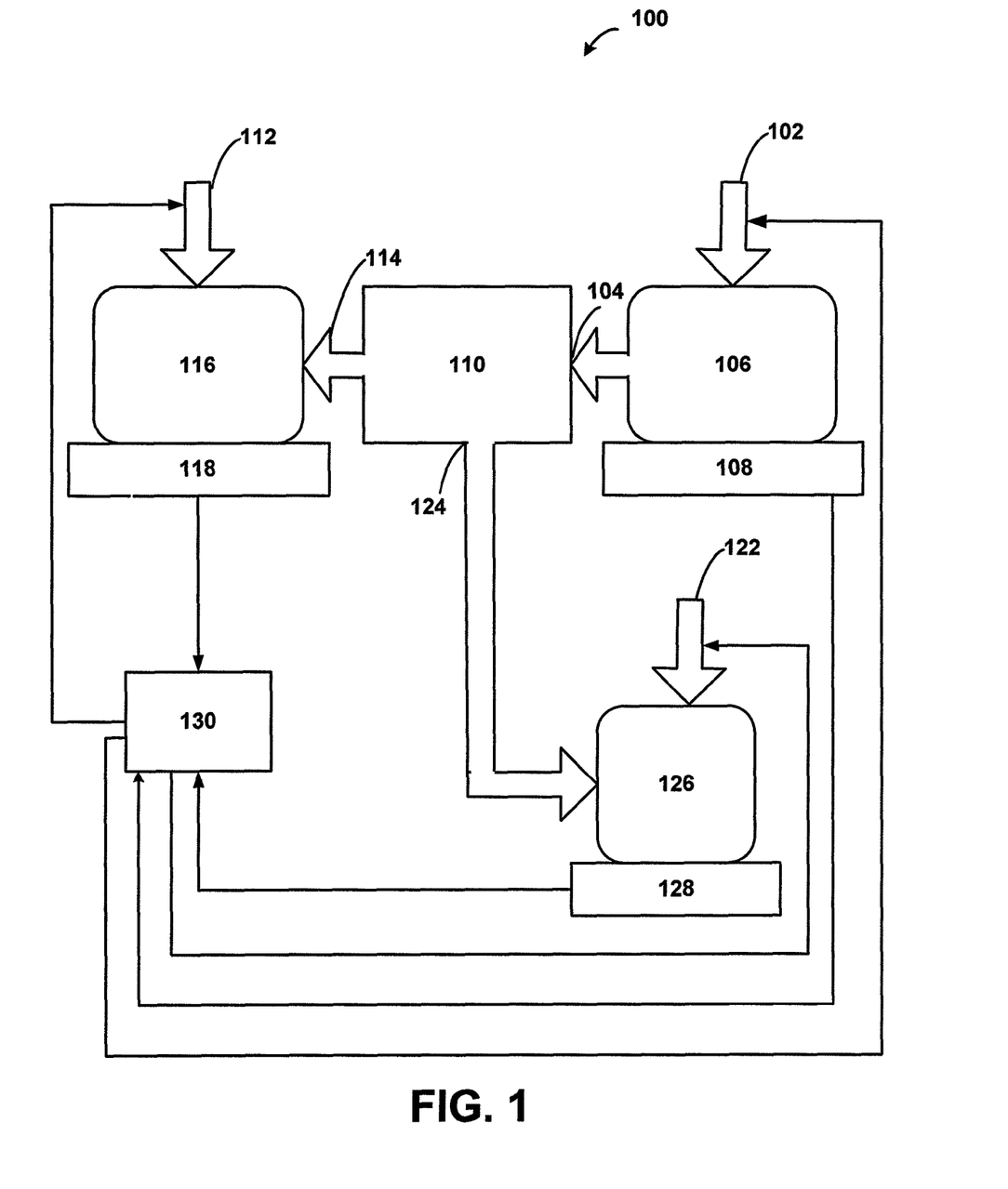
FIG. 1 shows an exemplary pumpless SPF system according to the invention.

Now referring to FIG. 1, an exemplary system 100 includes a controllable pressure source 102 coupled to a feed container 106. A mass measurement device 108 measures the mass of a fluid in the feed container 106. The feed container 106 is fluidly coupled to a feed inlet 104 of a separation or filtration module (e.g., a single pass filtration module) 110 including retentate outlet 114 and a permeate outlet 124. The system further includes a retentate container 116 and a mass measurement device 118 to measure the mass of a fluid in the retentate container 116. The retentate container 116 is coupled to a controllable pressure source 112 and fluidly coupled to the retentate outlet 114. The system further includes a permeate container 126 coupled to a controllable pressure source 122 and fluidly coupled to the permeate outlet 124. It is understood that the pressure source 122 can be the ambient atmospheric pressure. A mass measurement device 128 measures the mass of a fluid in the permeate container 126. The illustrated exemplary system further includes a pressure controller 130 connected to mass measurement devices 108, 118 and 128, and connected to controllable pressure sources 102, 112 and 122. It is understood that only two of the three mass measurement devices 108, 118 and 128 and corresponding controllable pressure sources 102, 112 and 122 are needed to control the single use, single pass process, and that the unneeded components can be left out of the system 100 or could be used to further refine the process. As described above, the mass measurement devices 108, 118, 128 can determine the masses, the weights or the volumes of the respective fluids. Alternatively, flow rates can be measured directly with the use of flow meters (not shown).

In operation, in a concentration process, for example, the pressure controller 130 receives signals indicating the weight of the feed and retentate containers. Using combinations of gas pressurized containers for the feed, retentate and permeate, and by applying a controlled pressure to at least two of the containers, the flow rates of feed, retentate and permeate can be controlled, as described below in conjunction with FIG. 2. The gas pressures can be above or below atmospheric pressure. In one embodiment the mass measurement devices 108, 118, and 128 are scales to measure the weights of the container and the fluid contained therein. Electronic means are preferred for monitoring these weights, preferably on an essentially continuous basis. In alternate embodiments the mass measurement devices 108, 118, and 128 include but are not limited to balances, load cells, liquid height sensors, and liquid hydrostatic head pressure sensor. The weight of the containers can be monitored as a function of time and hence the rate of weight change of the containers calculated. It is understood that the process can be controlled by applying a gas pressure directly to the process fluids in a container or applying the pressure indirectly to the process fluids by placing the containers within pressurized tanks. In one embodiment, the container is a disposable bag, the gas pressure is applied directly to the process fluids in a container, and the container is surrounded by a cage or unpressurized, unsealed tank. In another embodiment the container is sealed within a pressurized tank, and the pressure is applied within the sealed tank. One benefit of pumpless operation is a reduction in shear forces on the fluids being processed. Shear forces are also present in the tubing. Tubing as a source of shear can be mitigated by avoiding the use of very low diameter tubing. Shear within the module can be reduced by operating at low velocities, which may result in lower fluxes.

Since, in some embodiments, this control methodology does not require the use of disposable pumps or disposable sensors such as pressure gages and flow meters, it is simple and inexpensive and therefore lends itself to single use operation. The only disposable elements required are the single pass filtration module and associated tubing, and the containers (e.g., plastic bags). The containers are generally flexible, but in an alternate embodiment are rigid containers. In another embodiment, the containers are reusable tanks which can withstand higher pressures. If desired, however, some or all elements can be reusable, e.g., some or all sensors, modules, pipes and/or tanks. Inclusion of suitable filters between the containers and the source of the controlled gas pressures, as described in conjunction with FIG. 6, prevents intrusion of the liquids into the gas source and its control elements, which makes it unnecessary to dispose of these elements. If desired, pressure gages or other sensors, such as temperature gages, pH meters and/or spectrophotometer cells, can be positioned on various points of the system for the purpose of monitoring, but these sensors are not needed for the basic control of the single-use SPF device. In one embodiment, the feed container 106 is pressurized to maintain a desired flow rate out of the container 106 and into the single pass filtration module 110. The retentate container 116 is pressurized to maintain a desired retentate flow rate into the container 116. By this means the feed rate and the recovery or conversion are controlled. This is of course equivalent to controlling the feed rate and permeation rate. The process is operated in a manner similar to the process described below in conjunction with FIG. 2. The system 100 can be integrated with a chromatography system.

In certain embodiments, high conversion in a single pass is obtained by employing low specific feed rates. When operating concentration modules and systems in an SPF mode, the conversion is determined by selecting any two of the following parameters: the feed flow rate, the retentate flow rate, and the permeate flow rate. Selecting and controlling two of these parameters determines the values of the remaining parameters. It is understood that any practical system has a maximum allowable pressure, and that the selection of a desired feed rate may lead to pressures that exceed this limiting pressure. In this case, the feed rate can be set at any value below that which results in excessive pressures. It is further understood that either positive pressure sources, pressurized gas can be used, or ambient atmospheric pressure or alternatively vacuum sources can be used.

In one embodiment (not shown), the system 100 includes load cells as the mass measurement devices 108, 118, and 128. A controlled vacuum is used in place of the controllable pressure source 122, and a vacuum is applied to the permeate container. The controlled vacuum increases TMP to provide enhanced flux performance. In operation, the vacuum is initially set and the process is controlled by controllable pressure sources 102 and 112.

It is further understood that the process can be controlled by using only two mass measurement devices and two corresponding controllable pressures. The single use process is compatible with a number of single pass filters, including but not limited to, cartridge filters, staged filters, hollow fiber filters and spiral wound filters.

Figure 2:
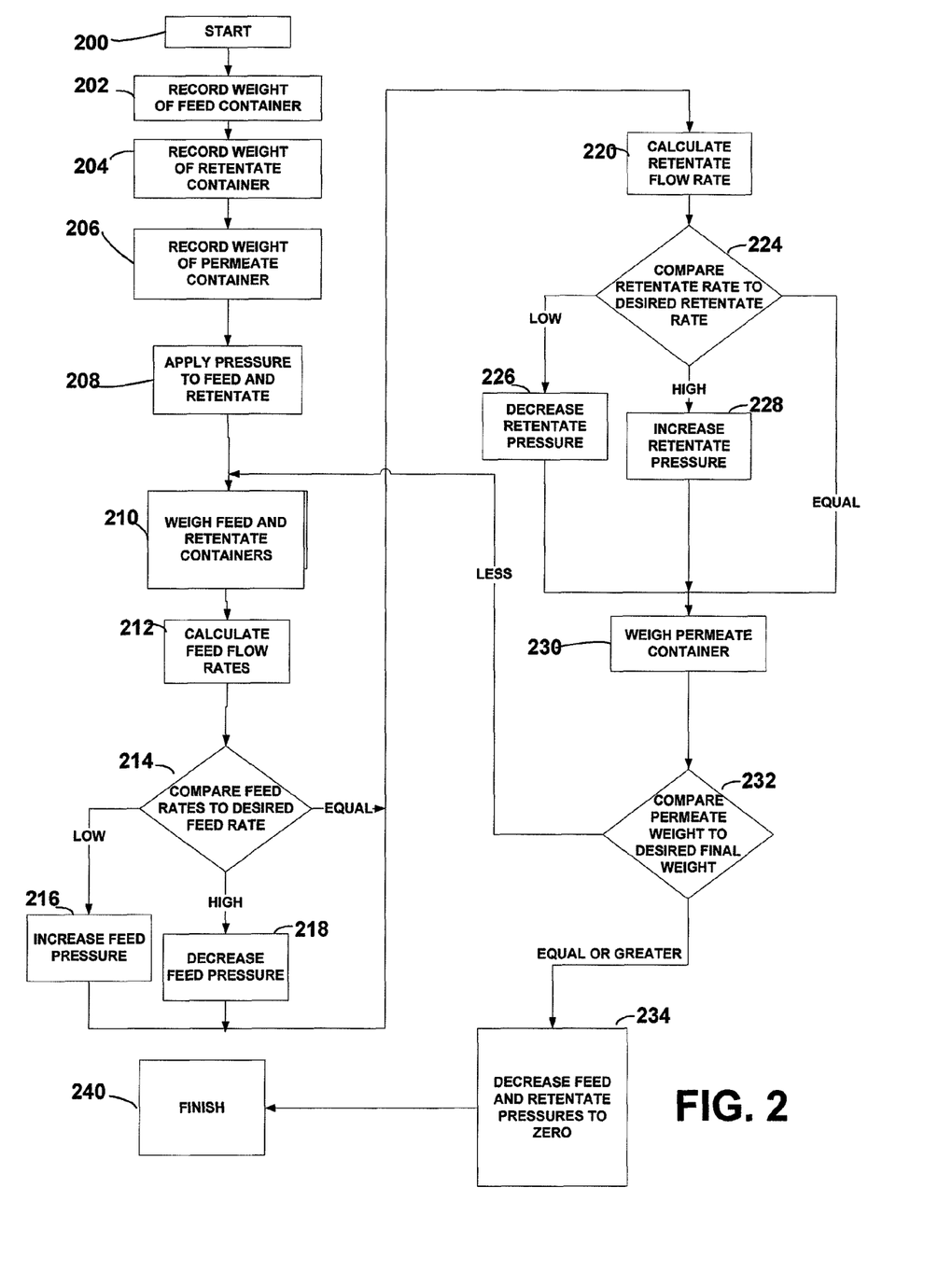
FIG. 2 is a flow diagram illustrating the steps used to process a liquid and recover the retentate or permeate fractions using the device of FIG. 1.

Turning now to FIG. 2, an exemplary flow diagram illustrates a process for processing a feed stream and recovering the retentate fraction and the permeate fraction using the filter system of FIG. 1. In the flow diagram of FIG. 2 the rectangular elements are herein denoted "processing blocks" (typified by element 202 in FIG. 2) and represent manual processing steps. The diamond shaped elements in the flow diagram are herein denoted "decision blocks" (typified by element 214 in FIG. 2) and represent decisions which affect the operation of the processing blocks. Alternatively, the processing blocks represent steps performed by functionally equivalent automated equipment. It will be appreciated by those of ordinary skill in the art that some of the steps described in the flow diagrams may be implemented automatically while others may be implemented in a different manner (e.g., via a manual procedure) and that both positive pressure source and negative pressure (e.g., vacuum) sources can be used in single use SPF processing, both positive and negative pressure sources collectively referred to pressure sources. It will also be appreciated by those of ordinary skill in the art that unless otherwise indicated herein, the particular sequence of steps described is illustrative only and can be varied without departing from the spirit of the invention.

In one embodiment, the operation of the pressure controller 130 is implemented as a processor running computer software instructions or groups of instructions. The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown.

The process commences in step 200, following which the feed container 106 is weighed at step 202. In step 204 the retentate container 116 is weighed and in step 206 the permeate container 126 is optionally weighed. In step 208, pressure is applied to the controllable pressure sources 102 and 112 according to an initial predetermined value. In one embodiment, both pressures are applied substantially simultaneously.

Step 210 begins the main processing loop where the feed container 106 and the retentate container 116 are weighed. The cycle time of the main processing loop is adjustable and in one embodiment is set for fifteen seconds. In step 212, the feed flow rate is calculated. In one embodiment, the flow rate is calculated by subtracting the current weight from the initial weight and dividing by the elapsed time. In another embodiment the flow rate is provided directly by a flow meter (not shown) measuring flow into/out of the respective container.

In step 214, the feed flow rate is compared to the desired feed flow rate. If it is determined that the feed flow rate is lower than the desired feed flow rate, the pressure controller 130 increases the feed pressure at the controllable pressure source 102 in step 216; if it is determined that the feed flow rate is greater than the desired feed flow rate, the pressure controller 130 decreases the feed pressure at the controllable pressure source 102 in step 218, and processing continues at step 220. If it is determined that the feed flow rate is approximately equal to the desired feed flow rate, processing continues at step 220. In one embodiment, the pressures are adjusted, by approximately the same percentage as the difference between measured and desired flow rates.

In step 220, the retentate flow rate is calculated. In one embodiment, the flow rate is calculated by subtracting the current weight from the initial weight and dividing by the elapsed time. In step 224, the retentate flow rate is compared to the desired retentate flow rate. If it is determined that the retentate flow rate is lower than the desired retentate flow rate, the pressure controller 130 decreases the retentate pressure at the controllable pressure source 112. In step 226, if it is determined that the retentate flow rate is greater than the desired retentate flow rate, the pressure controller 130 increases the retentate pressure at the controllable pressure source 102 in step 228, and processing continues at step 230. If it is determined that the retentate flow rate is approximately equal to the desired retentate flow rate, processing continues at step 230. In one embodiment, the retentate flow rate is calculated and controlled in a similar manner as described above in conjunction with steps 212-218.

In step 230 the permeate container is weighed. In step 224, the permeate weight is compared to the desired final permeate weight. If it is determined that the permeate weight is lower than the desired final permeate weight processing continues at step 210. If it is determined that the permeate weight is equal to or greater than the desired final permeate weight processing continues at step 234.

In step 234 the feed and retentate pressures are decreased to zero and the process is finished in step 340. In another alternative embodiment, trans-membrane pressure (TMP) can also be controlled. In some concentration processes it is desirable to control the average TMP in conjunction with control of the concentration factor. In this embodiment, the single pass filtration system is equipped with gas pressurized containers for the feed, retentate and permeate. These containers are equipped with means for monitoring their weights. Pressure sensors are provided on the gas supply side of the containers. These pressure gages are used to calculate the average TMP of the system. The pressure in the feed container is adjusted to produce the desired feed rate to the module. The pressure in the permeate container is adjusted to achieve the desired average TMP.

In one embodiment at the conclusion of the process the product is recovered as follows:

When the feed tank is empty the pressures in the feed, permeate, retentate and diafiltrate containers are adjusted so that:

The feed container weight remains constant;
the diafiltrate container weight remains constant; and
the permeate container weight decreases.

This causes the permeate to flow through the filtration module to recover residual fluid into the retentate. Flow is stopped when the desired amount of residual fluid has been recovered.

A variety of pressure sources can be used. For example, a vacuum source can be a liquid driven aspirator or venturi, a central vacuum supply of the type commonly found in laboratories, a dedicated vacuum pump, or combinations thereof. A detailed list of means and devices for generating vacuums is given in Perry's Chemical Engineering Handbook, 6th edition, McGraw-Hill, 1984, at pp. 6-32 to 6-37. Other suitable pressure sources include, for example, compressed gases from a cylinder with conventional means for regulating the applied pressure, using pressurized gas from a central source commonly available in laboratories, using a dedicated compressor from among the types described, for example, in Section 6 of Perry's Chemical Engineering Handbook. Peristaltic pumps are suitable for providing driving forces in the methods and devices of the present invention.

Figure 3:
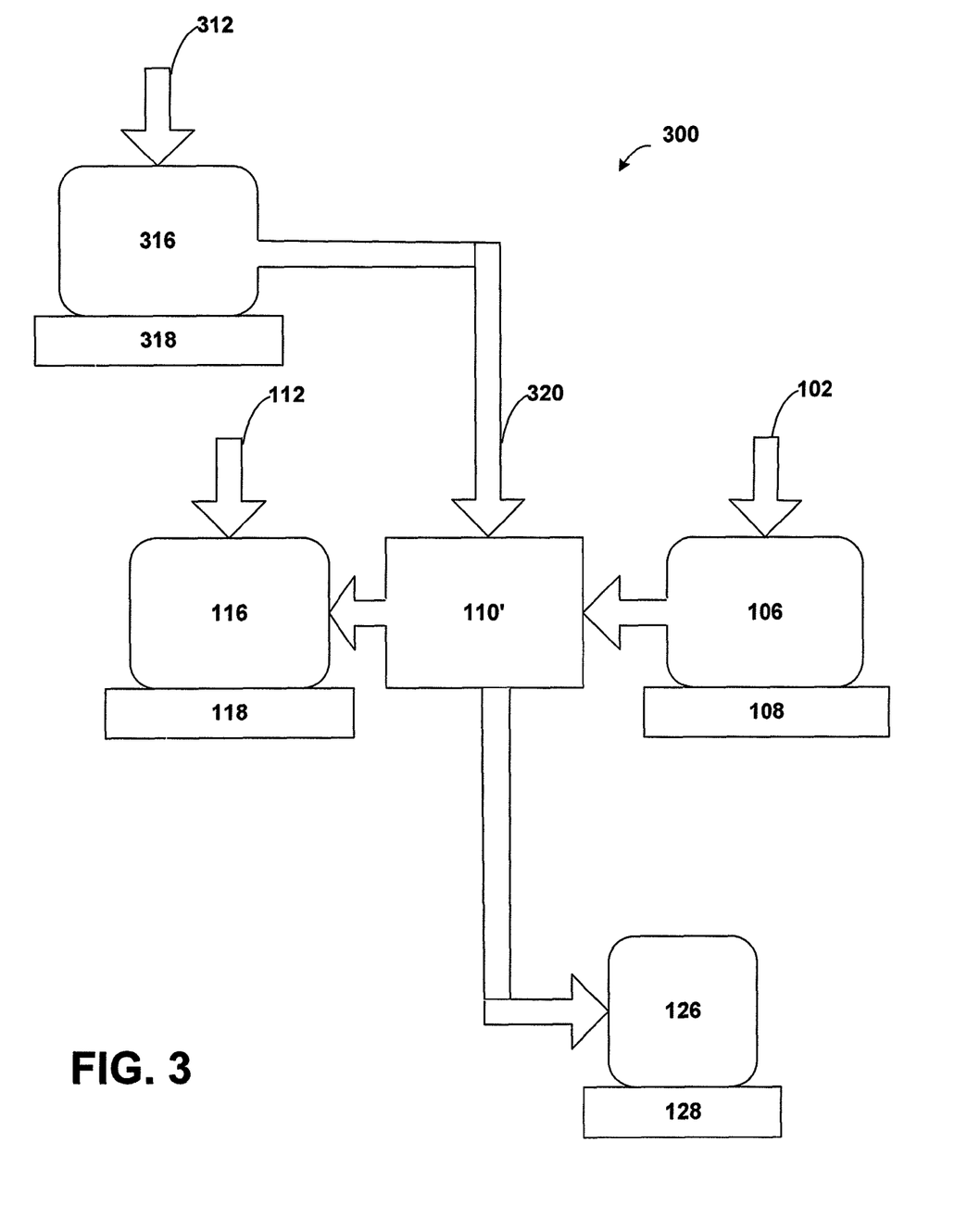
FIG. 3 shows an exemplary pumpless diafiltration system according to the invention.

Referring to FIG. 3, in which like elements are provided having like reference designations as in FIG. 1 (controller 130 and connections not shown in FIG. 3), an exemplary single use filtration system 300 suitable for diafiltration additionally includes a single pass filtration module 110' similar to the single pass filtration module 110 of FIG. 1 with the addition of a diafiltration inlet port 320. The illustrated system 300 further includes a diafiltration container 316 disposed adjacent a mass measurement device 318 coupled to a controllable pressure source 312 and fluidly coupled to the diafiltration inlet port 320.

Some or all of the stages in the single pass filtration module 110' are connected by means of conduits and hydraulic resistors to a gas pressurized container of diafiltrate, which is equipped with means for monitoring its mass, volume or weight. As described above, the feed container 106 and retentate container 116 are equipped with means for monitoring their masses, volumes or weights and connected to controlled gas pressure sources. The feed container 106 pressure is controlled to obtain a desired feed rate to the filtration system 110'. The retentate container pressure is controlled to obtain a desired flow rate of retentate, thus achieving a desired concentration factor. In operation, control of the rate of total diafiltration flow is accomplished by applying a suitable pressure to the diafiltrate container. In one embodiment, the rate of retentate flow is set to equal the rate of feed flow, thus achieving a constant volume diafiltration. In alternate embodiments, it is necessary to control only three of the four controllable pressures (feed, retentate, diafiltration, and permeate).

Figure 4:
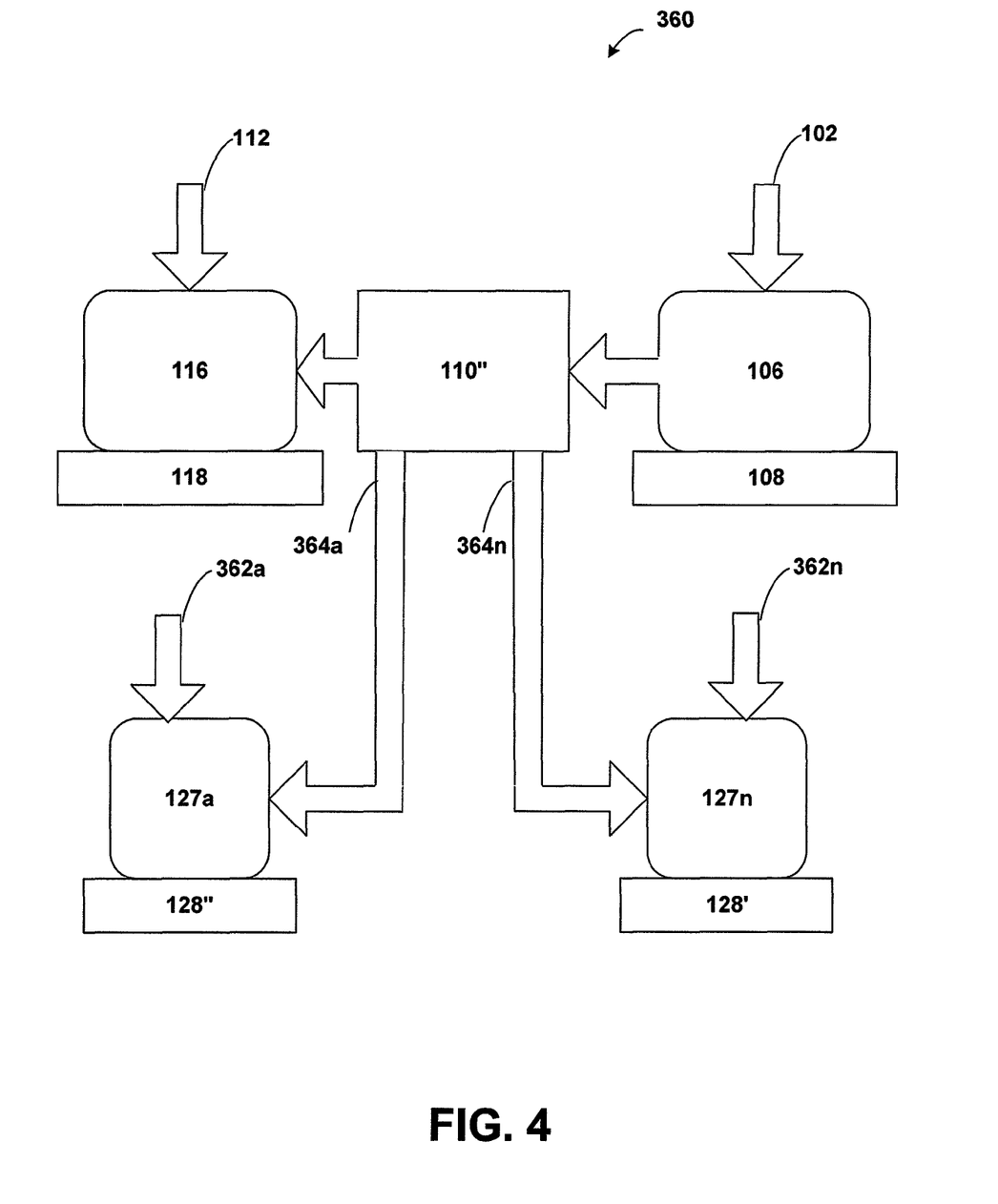
FIG. 4 shows an exemplary filter system similar to the system of FIG. 1 including staged permeate control.

Referring to FIG. 4 in which like elements are provided having like reference designations as in FIG. 1 (controller 130 and connections not shown in FIG. 4), an exemplary segregated-permeate single use filtration system 360, one in which the permeate stream from one or more stages is segregated and collected separately from the permeate stream of the rest of the other stages, additionally includes a single pass filtration module 110" having a plurality of permeate outlets 364a-364n. The system 360 further includes controllable pressure sources 362a-362n coupled to permeate containers 127a-127n respectively.

In operation, the multi stage system provides better control of the concentration and the permeation rates in the stages chosen to be controlled. This may be desirable in order to avoid fouling of the membrane or to insure passage of some solutes. In one embodiment the single pass filtration module 110" is a multi-stage system each stage having a plurality of channels wherein the specific membrane area of at least one channel is greater than about 40 $cm^{-1}$, the dimensionless length of the system is greater than about 2,000 and the dimensionless length of at least one of the plurality of stages is less than about 6,000 as described in U.S. Pat. No. 7,384,549.

In one embodiment, the feed rate and stage permeation rates are controlled by applying pressure to the feed container to control the feed rate to the system. The permeate ports of individual stages of a single pass system are connected to pressurized containers. The feed and retentate are also connected to pressurized containers. All containers are equipped with means for monitoring their masses, volumes or weight of contained fluid. The pressure applied to the feed container is used to control the feed rate to the system. A pressure is applied to the retentate container to control the retentate flow rate. The pressures applied to the individual permeate containers 127a-127n are used to control the permeation rates of all stages.

In another embodiment, the feed rate and selected stage permeation rates can be controlled by selectively applying pressure to the staged permeate containers. In this embodiment, the pressure in the retentate container is used to control the retentate flow rate, hence the overall system conversion. In one embodiment, not all of the stage permeation rates are controlled, and the retentate flow rate is controlled to control the overall concentration factor.

Figure 5:
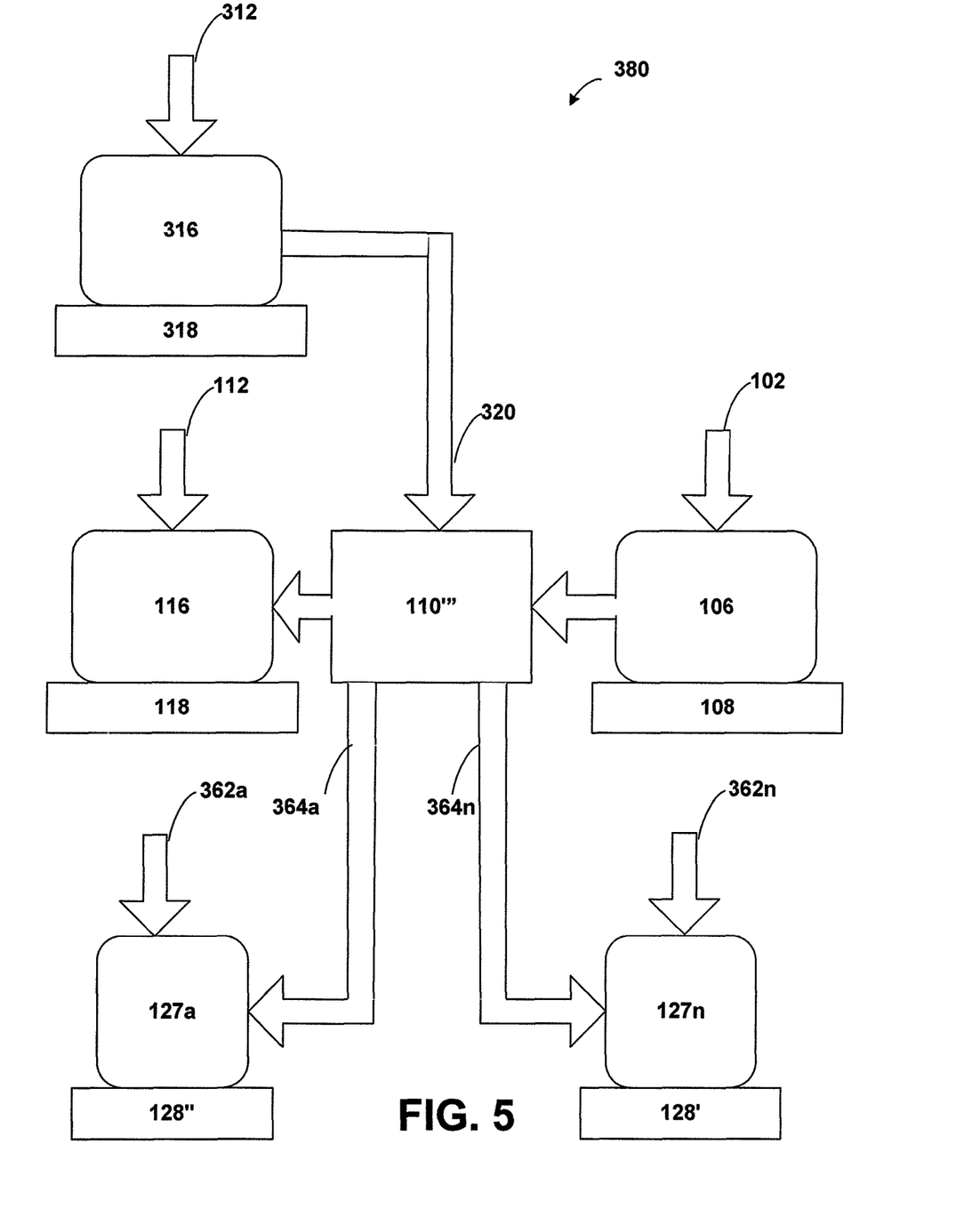
FIG. 5 shows an exemplary diafiltration system similar to the system of FIG. 3 including staged permeate control.

Now referring to FIG. 5, in which like elements are provided having like reference designations as in FIG. 3 (controller 130 and connections not shown in FIG. 5), an exemplary staged permeate diafiltration single use system 380 additionally includes a single pass filtration module 110''' having a plurality of a permeate outlets 364a-364n.

In operation, the permeates of selected stages are connected to pressurized containers equipped with means for monitoring their weights. The selected stages 364a-364n in the system 380 are connected by means of conduits to a gas pressurized container of diafiltrate, which is equipped with means for monitoring its weight. The feed container and retentate container are equipped with means for monitoring their weight and connected to controlled gas pressure sources. The feed container pressure is controlled to obtain a desired feed rate to the filtration system. The retentate container pressure is controlled to obtain a desired flow rate of retentate, thus achieving a desired concentration factor. In some embodiments, the rate of retentate flow will be set to equal the rate of feed flow, thus achieving a "constant volume diafiltration." A fixed pressure is applied to the diafiltrate container. The pressures in the individual permeate containers are controlled to obtain desired individual permeation rates.

In an alternative embodiment, the flow rate of diafiltrate to the stages with diafiltration is controlled by means of hydraulic resistors on the conduits between the diafiltration tank and the inlets of said stages. In this case the pressure in the permeate containers in not controlled and is generally at atmospheric pressure. In another alternative embodiment, more than one diafiltrate source can be used.

Figure 6:
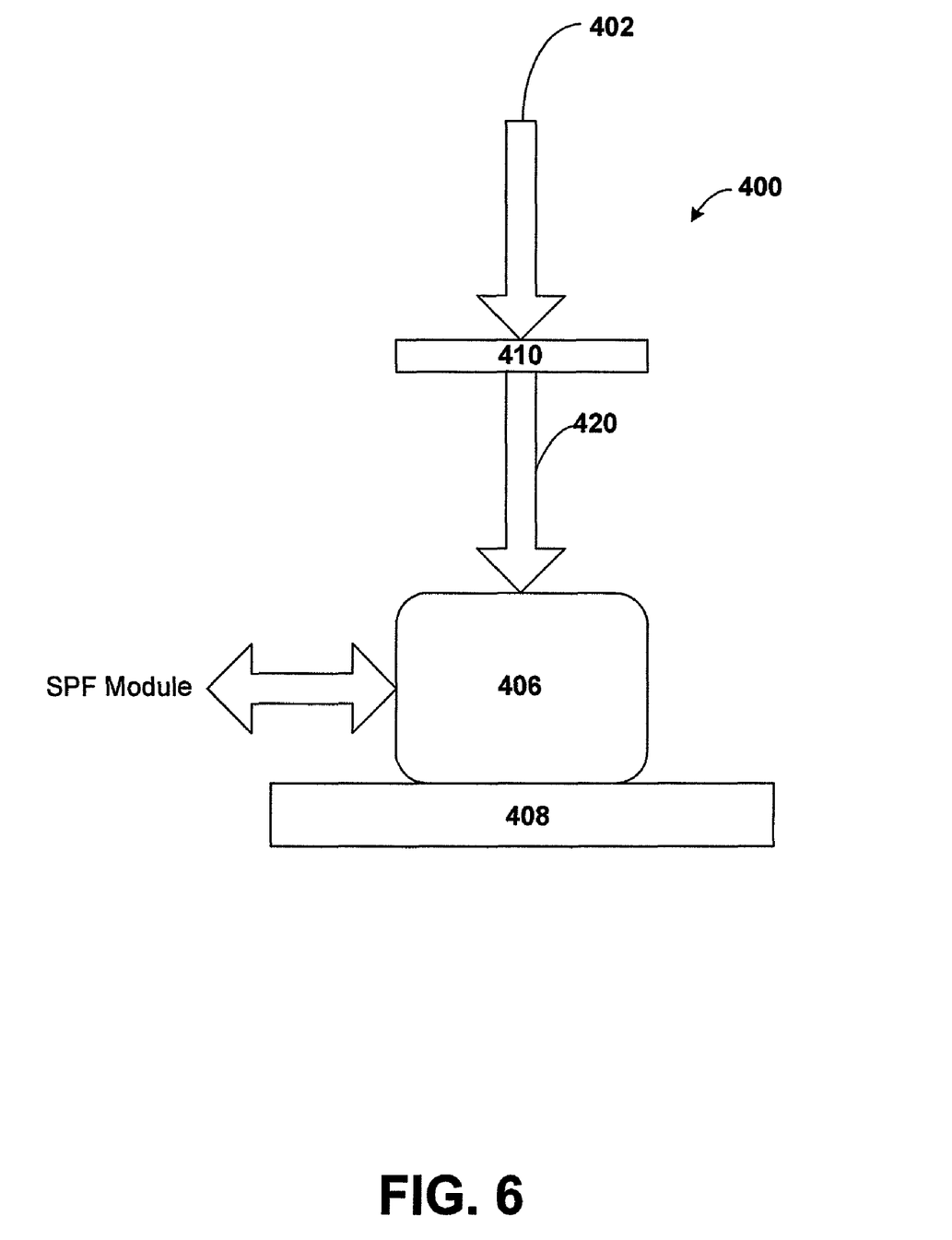
FIG. 6 is a schematic diagram of an exemplary basic subsystem including a filter, container, and mass measurement device for connection to a controlled pressure source according to the invention.

Referring to FIG. 6, an exemplary container subsystem 400 for use in any embodiment of a system according to the invention includes a container 406 (e.g., wherein the container is suitable for any of feed, retentate, and permeate), coupled via a tube 420 to a filter 410 disposed between a controllable pressure source 402 and the container 406. In the illustrated embodiment, the subsystem further includes a mass measurement device 408 to measure the mass of fluid in the container 406. In one embodiment, the filter 410 is a hydrophobic filter, for example, having a pore size of between 0.1 and 10 micrometers. It is understood that one or more of the container 406, the tube 420, and the filter 410 can be disposable components. In accordance with any embodiment of a system according to the invention, a pressure controller (not shown) can be connected to the mass measurement device(s) and controllable pressure source(s) of the subsystem(s).

Figure 7:
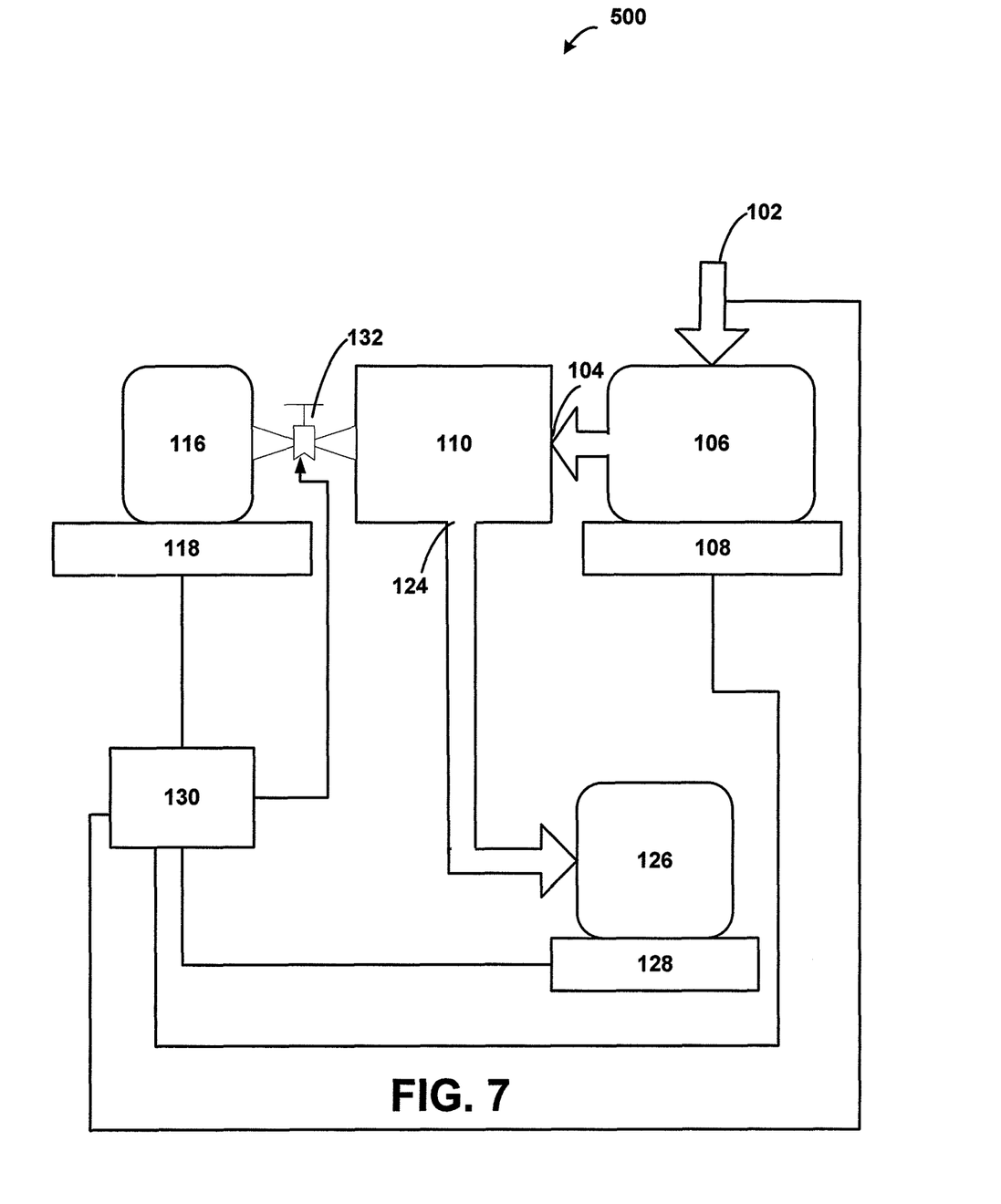
FIG. 7 shows an exemplary pumpless system similar to the system of FIG. 1 in which a valve is used to control the flow rate of the retentate.

Referring to FIG. 7, in which like elements are provided having like reference designations as in FIG. 1, an alternative exemplary filtration system 500 includes a control valve 132 fluidly coupled to the retentate container 116 and the retentate outlet 114 of the single pass filtration module 110. The control valve 132 is controlled by controller 130. The control valve 132 replaces the function of the pressure source 112 shown in FIG. 1.

In operation, the control valve 132 controls the flow rate of the retentate into the retentate tank. This permits the retentate tank to be held at atmospheric pressure. The setting of the control valve is controlled, based on the mass of fluid in container 116, using the controller 130. The control valve 132 can optionally be disposable for single use operation. However it may be possible to use valves that require the disposal of only the fluid contact components.

Figure 8:
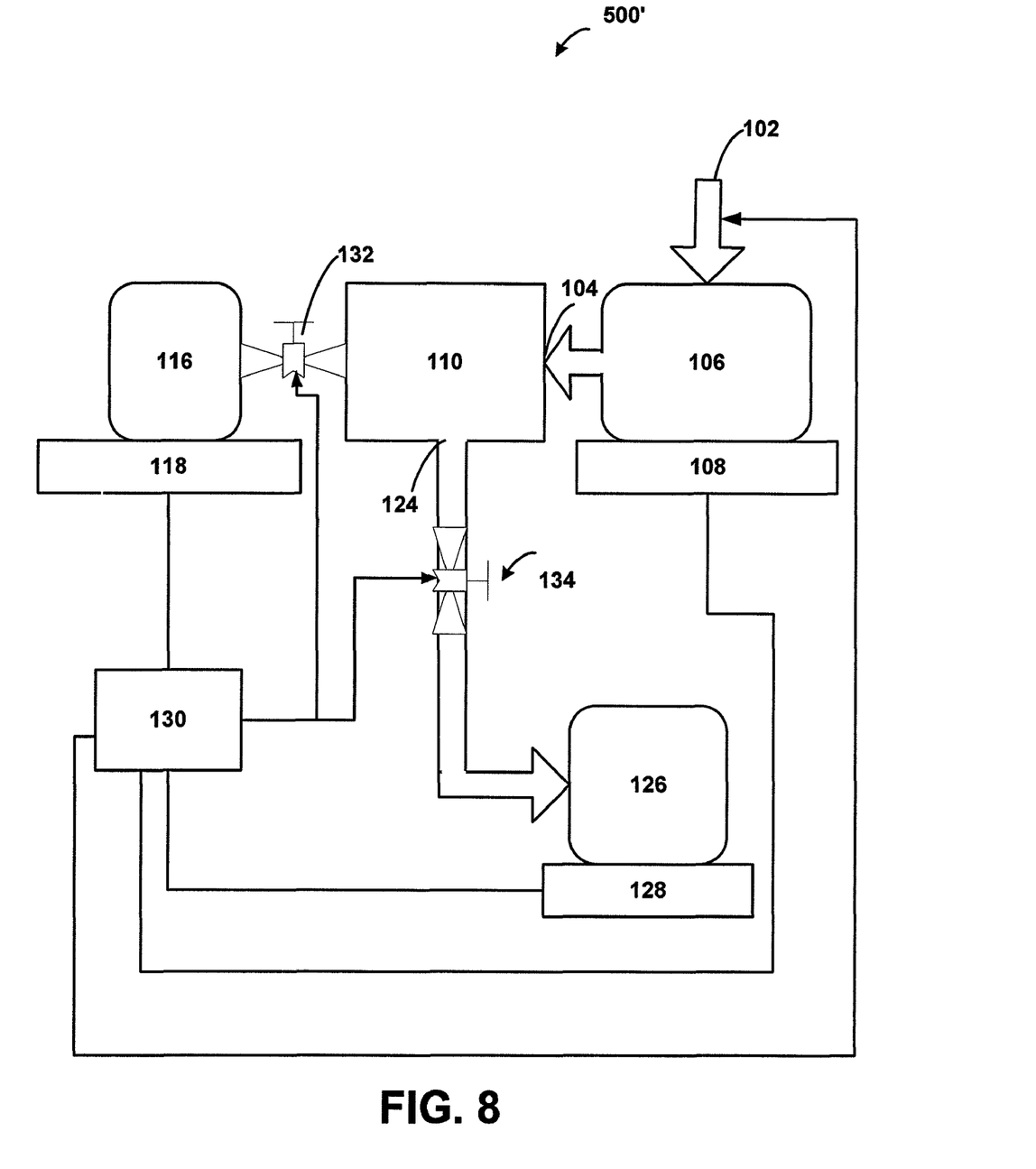
FIG. 8 shows an exemplary pumpless system similar to the system of FIG. 7 in which an additional valve is used to control the flow rate of the permeate.

Referring to FIG. 8, in which like elements are provided having like reference designations as in FIG. 7, an alternative exemplary filtration system 500' includes a control valve 134 fluidly coupled to the permeate container 126 and the permeate outlet 124 of the single pass filtration module 110. The control valve 134 is controlled by controller 130. In operation, valve 134 provides control of the permeation. It being understood, that since this system has two degrees of freedom, only two of the three control elements shown in this figure are be used simultaneously.

It is understood that although the embodiments described herein relate specifically to separations of interest in biomolecular applications, the principles, practice and designs described herein are also useful in other applications, including but not limited to the manufacture of vaccines and other macromolecules not necessarily of a biological nature.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. The descriptions and diagrams of the methods described herein can be performed in any suitable order unless otherwise indicated herein or otherwise clearly contradicted by context.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filtration system comprising:
  a single pass filtration module comprising a feed inlet, a retentate outlet and a permeate outlet;
  a first container coupled to a first controllable pressure source and fluidly coupled to one of the feed inlet, the retentate outlet and the permeate outlet;
  a first mass measurement device disposed to measure the mass of a fluid in the first container;
  a second container fluidly coupled to a different one of the feed inlet, retentate outlet and the permeate outlet;
  a second mass measurement device disposed to measure the mass of a fluid in the second container; and
  a pressure controller to control the first pressure source in response to measurements from the respective mass measurement devices.

2. The module of claim 1 further comprising a second pressure source controlled by the pressure controller and coupled to the second container.

3. The module of claim 2 wherein each of the first pressure source and the second pressure source is one of:
  a vacuum source;
  a compressed gas source; and
  ambient atmospheric pressure.

4. The module of claim 1 wherein the single pass filtration module further comprises a multi-stage system each stage having a plurality of channels wherein the specific membrane area of at least one channel is greater than about 40 cm$^{-1}$, the dimensionless length of the system is greater than about 2,000 and the dimensionless length of at least one of the plurality of stages is less than about 6,000.

5. The module of claim 1 wherein each of the mass measurement devices further comprises one of:
  a load cell;
  a flow meter
  a liquid height level sensor; and
  an embedded pressure sensor.

6. The module of claim 1 wherein the single pass filtration module comprises one of:
  a hollow fiber membrane;
  a flat-sheet membrane; and
  a spiral-wound element.

7. The module of claim 1 further comprising a diafiltration port passage fluidly coupled to the single pass filtration module and a diafiltrate container coupled to a third controllable pressure source, disposed in communication with a third mass measurement device and fluidly coupled to the diafiltration port passage.

8. The module of claim 1 wherein the first container is the feed container, the second container is the retentate container and the mass measurement devices are load cells.

9. The module of claim 8 further comprising a valve disposed between the single pass filtration module and at least one of the retentate container and the permeate container.

10. The module of claim 1 wherein the first pressure source is one of:
  a vacuum source;
  a compressed gas source; and
  ambient atmospheric pressure.

11. A method for filtering a liquid comprising:
  supplying a volume of the liquid from a feed container into
    a single pass filtration module comprising:
      a separation element having at least one flow channel having an inlet, an outlet and surface comprising a filtration membrane;
    the feed container fluidly coupled to the channel inlet;
    a retentate container fluidly coupled to the channel outlet;
    a permeate container fluidly coupled to the separation element;
  inducing the tangential flow of the liquid in the at least one flow channel by applying a first pressure differential between the feed container and retentate container; and
  inducing the permeation of a portion of the liquid through the filtration membrane into the permeate container by applying a second pressure differential between one of:
    the retentate container and permeate container; and
    the feed container and permeate container;
  measuring the flow rates of the at least two of feed, retentate, and permeate; and
  adjusting the first and second pressure differentials in response to the flow rate measurements.

12. The method of claim 11 wherein measuring the flow rates comprises measuring the masses of at least two of the containers.

13. The method of claim 11 wherein measuring the flow rates comprises measuring the liquid height within at least two of the containers.

14. The method of claim 11 wherein adjusting the first and second pressure differentials comprises determining the respective flow rates and adjusting the first and second pressure differentials in response to comparing the flow rates to a predetermined rate.

15. The method of claim 11 wherein the first and second pressure differentials are provided by at least one of:
  a compressed gas source
  ambient atmospheric pressure; and
  a vacuum source.

16. The method of claim 11 further comprising adding diafiltrate by controlling the pressure of a diafiltrate container fluidly coupled to a diafiltration port of the separation module in response to weighing the diafiltrate container.

17. The method of claim 11 further comprising applying a vacuum to the permeate container.

18. The method of claim 11 wherein supplying the volume of liquid from the feed container comprises supplying a predetermined volume of liquid.

19. The method of claim 11 further comprising supplementing control provided by pressurization of the containers by using at least one control valve.

20. The method of claim 19, wherein the at least one control valve comprises a retentate valve.

21. The method of claim 19, wherein the at least one control valve comprises a permeate valve.

22. A filtration system comprising:
- a single pass filtration module comprising a feed inlet, a retentate outlet and a permeate outlet, and one of: a hollow fiber membrane, a flat-sheet membrane, and a spiral-wound element;
- a first container coupled to a first controllable pressure source and fluidly coupled to one of the feed inlet, the retentate outlet and the permeate outlet, wherein the first controllable pressure source is one of: a vacuum source; a compressed gas source; and ambient atmospheric pressure;
- a pressure controller;
- a first mass measurement device disposed to measure the mass of a fluid in the first container, wherein the first mass measurement device is in communication with the pressure controller;
- a second container fluidly coupled to a second controllable pressure source and fluidly coupled to a different one of the feed inlet, retentate outlet and the permeate outlet, wherein the second controllable pressure source is one of a vacuum source; a compressed gas source; and ambient atmospheric pressure;
- a second mass measurement device disposed to measure the mass of a fluid in the second container, wherein the second mass measurement device is in communication with the pressure controller; and wherein,
- the pressure controller controls the first pressure source and the second pressure source in response to measurements from the first and second mass measurement devices.

* * * * *